(12) United States Patent
Goel et al.

(10) Patent No.: US 10,540,083 B2
(45) Date of Patent: Jan. 21, 2020

(54) USE OF HAND POSTURE TO IMPROVE TEXT ENTRY

(71) Applicant: University of Washington through its Center for Commercialization, Seattle, WA (US)

(72) Inventors: Mayank Goel, Seattle, WA (US); Jacob O. Wobbrock, Seattle, WA (US); Shwetak N. Patel, Seattle, WA (US); Leah Findlater, Hyattsville, MD (US)

(73) Assignee: University of Washington, Seattle, WA (US)

( * ) Notice: Subject to any disclaimer, the term of this patent is extended or adjusted under 35 U.S.C. 154(b) by 257 days.

(21) Appl. No.: 14/646,528

(22) PCT Filed: Dec. 11, 2013

(86) PCT No.: PCT/US2013/074428
§ 371 (c)(1),
(2) Date: May 21, 2015

(87) PCT Pub. No.: WO2014/093506
PCT Pub. Date: Jun. 19, 2014

(65) Prior Publication Data
US 2015/0317076 A1 Nov. 5, 2015

Related U.S. Application Data

(60) Provisional application No. 61/735,800, filed on Dec. 11, 2012.

(51) Int. Cl.
*G06F 3/0488* (2013.01)
*G06F 3/041* (2006.01)
*G06N 7/00* (2006.01)

(52) U.S. Cl.
CPC .......... *G06F 3/0488* (2013.01); *G06F 3/0416* (2013.01); *G06F 3/04886* (2013.01); *G06N 7/005* (2013.01)

(58) Field of Classification Search
CPC .... G06F 3/0488; G06F 3/0237; G06F 3/0416; G06F 3/04886; G06F 3/04842;
(Continued)

(56) References Cited

U.S. PATENT DOCUMENTS

| 6,173,121 B1 * | 1/2001 | Tomita ..................... G03B 5/00 396/52 |
| 2008/0278455 A1 * | 11/2008 | Atkins ................ G06F 3/04883 345/173 |

(Continued)

FOREIGN PATENT DOCUMENTS

| WO | 2010013276 A1 | 2/2010 |
| WO | 2014093506 A1 | 6/2014 |

OTHER PUBLICATIONS

International Search Report and Written Opinion dated Mar. 4, 2013 in International Application No. PCT/US2013/074428, filed Dec. 11, 2013. 14 pages.

(Continued)

Primary Examiner — Yaron Cohen
(74) Attorney, Agent, or Firm — Perkins Coie LLP

(57) ABSTRACT

A system for classifying a user touch event by a user interacting with a device as an intended key is provided. For different hand postures (e.g., holding device with right hand and entering text with right thumb), the system provides a touch pattern model indicating how the user interacts using that hand posture. The system receives an indication of a user touch event and identifies the hand posture of the user. The system then determines the intended key based on the user touch event and a touch pattern model for the identified hand posture. A system is also provided for determining the (Continued)

amount a presser a user is applying to the device based on dampening of vibrations as measured by an inertial sensor. A system is provided that uses motion of the device as measured by an inertial sensor to improve the accuracy of text entry.

16 Claims, 8 Drawing Sheets

(58) Field of Classification Search
CPC .... G06F 2203/04106; G06F 2203/04104; G06N 7/005
See application file for complete search history.

(56) References Cited

U.S. PATENT DOCUMENTS

| | | | | |
|---|---|---|---|---|
| 2012/0032891 | A1* | 2/2012 | Parivar | G06F 3/04883 345/173 |
| 2012/0162078 | A1* | 6/2012 | Ferren | G06F 3/04886 345/168 |
| 2012/0324384 | A1* | 12/2012 | Cohen | G06F 3/04886 715/765 |
| 2014/0082545 | A1* | 3/2014 | Zhai | G06F 3/04886 715/773 |

OTHER PUBLICATIONS

Azenkot, S. et al., "Touch Behavior with Different Postures on Soft Smartphone Keyboards", Proceedings of the 14th International Conference on Human-Computer Interaction with Mobile Devices and Services, Sep. 2012, pp. 251-260.
Barnard, L. et al., "Capturing the effects of context on human performance in mobile computing systems", Personal and Ubiquitous Computing, Jan. 2007, 81-96.
Behringer, R. et al., "Stabilization of a Display in a Moving Environment", Proceedings of the 5th Annual Federated Laboratory Symposium, Advanced Displays & Interactive Displays Consortium, 2001, abstract only, pp. 131-134.
Bragdon, E. et al., "Experimental analysis of touch-screen gesture designs in mobile environments", Proceedings of the SIGCHI Conference on Human Factors in Computing Systems, May 2011, pp. 403-412.
Brewster, S. , "Overcoming the lack of screen space on mobile computers", Personal and Ubiquitous Computing, May 2002, pp. 188-205.
Canon Inc., "What is Optical Image Stabilizer?", available online at: http://www.canon.com/bctv/faq/optis.html, Jan. 2012.
Chen, S.F. et al., "An empirical study of smoothing techniques for language modeling", Proceedings of the 34th Annual Meeting on Association for Computational Linguistics, Jun. 1996, pp. 310-318.
Cheng, L-P et al., "iRotate: Automatic Screen Rotation Based on Face Orientation", Proceedings of the SIGCHI Conference on Human Factors in Computing Systems, May 2012, pp. 2203-2210.
Choudhury, T. et al., "The Mobile Sensing Platform: An Embedded Activity Recognition System", IEEE Pervasive Computing, Apr.-Jun. 2008, pp. 32-41.
Clarkson, E.C. et al., "Exploring Continuous Pressure Input for Mobile Phones", submitted for review to Proceedings of the 18th Annual ACM Symposium on User Interface Software and Technology, 2005, 4 pages.
Crossan, A. et al., "Gait phase effects in mobile interaction", Extended Abstracts on Human Factors in Computing Systems, Apr. 2005, pp. 1312-1315.
Essl, G. et al., "Use the Force (or something)—Pressure and Pressure-Like Input for Mobile Music Performance", Proceedings of the 2010 New Interfaces for Musical Expression, Jun. 2010, pp. 15-18.
Faraj, K.A. et al., "BigKey: A Virtual Keyboard for Mobile Devices", Proceedings, Part III, 13th International Conference of Human-Computer Interaction (HCI '09), Ambient, Ubiquitous and Intelligent Interaction, Berlin: Springer-Verlag, Jul. 2009, vol. 5612 of the series Lecture Notes in Computer Science, pp. 3-10.
Fergus, R. et al., "Removing camera shake from a single photograph", ACM Transactions on Graphics (TOG)—Proceedings of ACM SIGGRAPH 2006, ACM SIGGRAPH 2006 Papers, Jul. 2006, pp. 787-794.
Findlater, L. et al., "Personalized input: improving ten-finger touch-screen typing through automatic adaptation", Proceedings of the SIGCHI Conference on Human Factors in Computing Systems, May 2012, pp. 815-824.
Findlater, L. et al., "Typing on Flat Glass: Examining Ten-finger Expert Typing Patterns on Touch Surfaces", Proceedings of the SIGCHI Conference on Human Factors in Computing Systems (CHI '11), pp. 2453-2462.
Fitzmaurice, G.W. et al., "Bricks: Laying the foundations for graspable user interfaces", Proceedings of the SIGCHI Conference on Human Factors in Computing Systems, May 1995, pp. 442-449.
Fitzpatrick, K. et al., "Another Look at Pedestrian Walking Speed", Journal of the Transportation Research Board, 2006, vol. 1982, pp. 21-29.
Games, P.A. , "Multiple Comparisons of Means", American Educational Research Journal, May 1971, pp. 531-565.
Go, K. et al., "CATKey: customizable and adaptable touchscreen keyboard with bubble cursor-like visual feedback", Proceedings, Part I, 11th IFIP TC 13 International Conference, Human-Computer Interaction (INTERACT 2007), Berlin: SpringerVerlag, vol. 4662 of the series Lecture Notes in Computer Science, pp. 493-496., Sep. 2007.
Goel, M. et al., "ContextType: Using Hand Posture Information to Improve Mobile Touch Screen Text Entry", Proceedings of the SIGCHI Conference on Human Factors in Computing Systems, Apr. 2013, pp. 2795-2798.
Goel, M. et al., "GripSense: Using Built-In Sensors to Detect Hand Posture and Pressure on Commodity Mobile Phones", Proceedings of the 25th Annual ACM Symposium on User Interface Software and Technology, Oct. 2012, pp. 545-554.
Goel, M. et al., "WalkType: Using Accelerometer Data to Accommodate Situational Impairments in Mobile Touch Screen Text Entry,", Proceedings of the SIGCHI Conference on Human Factors in Computing Systems, May 2012, pp. 2687-2696.
Goodman, J. et al., "Language modeling for soft keyboards", Proceedings of the 7th International Conference on Intelligent User Interfaces, Jan. 2002, pp. 194-195.
Gunawardana, A. et al., "Usability Guided Key-Target Resizing for Soft Keyboards", Proceedings of the 15th International Conference on Intelligent User Interfaces, Feb. 2010, pp. 111-118.
Gupta, S. et al., "SqueezeBlock: using virtual springs in mobile devices for eyes-free interaction", Proceedings of the 23rd Annual ACM Symposium on User Interface Software and Technology, Oct. 2010, pp. 101-104.
Harrison, B.L. et al., "Squeeze me, hold me, tilt me! An exploration of manipulative user interfaces", Proceedings of the SIGCHI Conference on Human Factors in Computing Systems, Jan. 1998, pp. 17-24.
Hart, S.G. et al., "Development of NASA-TLX (Task Load Index): Results of Empirical and Theoretical Research", Human Mental Workload, P.A. Hancock and N. Meshkati (Eds.), Amsterdam: North Holland Press, 1998, 46 pages.
Hart, S.G. , "NASA—Task Load Index (NASA—TLX): 20 Years Later", Proceedings of the Human Factors and Ergonomics Society 50th Annual Meeting, 2006, pp. 904-908.
Heo, S. et al., "Force gestures: augmented touch screen gestures using normal and tangential force", Extended Abstracts on Human Factors in Computing Systems, May 2011, pp. 1909-1914.
Heo, S. et al., "Forcetap: extending the input vocabulary of mobile touch screens by adding tap gestures", Proceedings of the 13th International Conference on Human Computer Interaction with Mobile Devices and Services, Aug. 2011, pp. 113-122.
Higgins, J.J. et al., "An aligned rank transform test for interaction", Nonlinear World, 1994, pp. 201-211.

(56) References Cited

OTHER PUBLICATIONS

Himberg, J. et al., "On-line personalization of a touch screen based keyboard,", Proceedings of the 8th International Conference on Intelligent User Interfaces, Jan. 2003, pp. 77-84.

Hinckley, K. et al., "Sensing techniques for mobile interaction", Proceedings of the 13th Annual ACM Symposium on User Interface Software and Technology, Nov. 2000, pp. 91-100.

Hinckley, K. et al., "Sensor synaesthesia: touch in motion, and motion in touch", Proceedings of the SIGCHI Conference on Human Factors in Computing Systems, May 2011, pp. 801-810.

Holz, C. et al., "Understanding touch", Proceedings of the SIGCHI Conference on Human Factors in Computing Systems, May 2011, pp. 801-810.

Iwasaki, K. et al., "Expressive typing: a new way to sense typing pressure and its applications", Extended Abstracts on Human Factors in Computing Systems, Apr. 2009, pp. 4369-4374.

Johnson, P., "Usability and mobility: Interactions on the move", Proceedings of the 1st Workshop on Human Computer Interaction with Mobile Devices, University of Glasgow, Scotland, GIST Technical Report, May 1998.

Johnson, P. et al., "Usability and mobility; interactions on the move", First Workshop on Human-Computer Interaction with Mobile Devices, available online at: http://www.dcs.gla.ac.uk/~johnson/papers/mobile/HCIMD1.html#_Toc420818965, May 1998.

Jones, E. et al., "GesText: accelerometer-based gestural text-entry systems", Proceedings of the SIGCHI Conference on Human Factors in Computing Systems, Apr. 2010, pp. 2173-2182.

Joshi, N. et al., "Image deblurring using inertial measurement sensors", ACM Transactions on Graphics (TOG)—Proceedings of the ACM SIGGRAPH, Jul. 2010.

Kane, S.K. et al., "TrueKeys: Identifying and correcting typing errors for people with motor impairments", Proceedings of the 13th International Conference on Intelligent User Interface (IUI '08), Sep. 2008, pp. 109-118.

Karlson, A.K. et al., "AppLens and launchTile: two designs for one-handed thumb use on small devices", Proceedings of the SIGCHI Conference on Human Factors in Computing Systems, Apr. 2005, pp. 201-210.

Karlson, A.K. et al., "Understanding Single-Handed Mobile Device Interaction", J. Lumsden (Ed.), Handbook of Research on User Interface Design and Evaluation for Mobile Technology, Idea Group Reference, Jan. 2006, pp. 86-101.

Kim, K.-E. et al., "Hand Grip Pattern Recognition for Mobile User Interfaces", Proceedings of the 18th Conference on Innovative Applications of Artificial Intelligence, Jul. 2006, pp. 1789-1794.

Kristensson, P. et al., "Relaxing stylus typing precision by geometric pattern matching", Proceedings of the 10th International Conference on Intelligent User Interfaces (IUI '05), Jan. 2005, pp. 151-158.

Kristensson, P. et al., "Shark: A large vocabulary shorthand writing system for pen-based computers", Proceedings of the 17th Annual ACM Symposium on User Interface Software and Technology (UIST '04), Oct. 2004, pp. 43-52.

Kundur, D. et al., "Blind image deconvolution", IEEE Signal Processing Magazine, May 1996, pp. 43-64.

Lin, M. et al., "How do people tap when walking? An empirical investigation of nomadic data entry", International Journal of Human-Computer Studies, Sep. 2007, 759-769.

Mackay, B. et al., "Walk 'n Scroll: A Comparison of Software-based Navigation Techniques for Different Levels of Mobility", Proceedings of the 7th International Conference on Human Computer Interaction with Mobile Devices and Services, Sep. 2005, pp. 183-190.

Mackenzie, L.S. et al., "Phrase sets for evaluating text entry techniques", Extended Abstracts on Human Factors in Computing Systems, Apr. 2003, pp. 754-755.

Mackenzie, L.S. et al., "Text Entry for Mobile Computing: Models and Methods, Theory and Practice", Human-Computer Interaction, Jun. 2011, pp. 147-198.

Mizobuchi, S. et al., "Mobile Text Entry: Relationship between Walking Speed and Text Input Task Difficulty", Proceedings of the 7th International Conference on Human Computer Interaction with Mobile Devices & Services, Sep. 2005, pp. 122-128.

Mustonen, T. et al., "Examining Mobile Phone Text Legibility while Walking", Extended Abstracts on Human Factors in Computing Systems, Apr. 2004, pp. 1243-1246.

Partridge, K. et al., "TiltType: accelerometer-supported text entry for very small devices", Proceedings of the 15th Annual ACM Symposium on User Interface Software and Technology, Oct. 2002, pp. 201-204.

Phielipp, M. et al., "Fast, Accurate, and Practical Identity Inference Using TV Remote Controls", Proceedings of the 22nd Innovative Applications of Artificial Intelligence, Jul. 2010, pp. 1827-1832.

Rahmati, A. et al., "NoShake: Content stabilization for shaking screens of mobile devices", IEEE International Conference on Pervasive Computing and Communications 2009, Mar. 2009, pp. 1-6.

Ramos, G. et al., "Pressure widgets", Proceedings of the SIGCHI Conference on Human Factors in Computing Systems, Apr. 2004, pp. 487-494.

Rudchenko, D. et al., "Text Text Revolution: A Game That Improves Text Entry on Mobile Touchscreen Keyboards", Proceedings of the 9th International Conference on Pervasive Computing, Jun. 2011, pp. 206-213.

Sazawal, V. et al., "The Unigesture Approach", Proceedings of the 4th International Symposium on Mobile Human-Computer Interaction, Sep. 2002, (MobileHCI '02), vol. 2411 of the series Lecture Notes in Computer Science, pp. 256-270.

Schmidt, A. et al., "Advanced Interaction in Context", Proceedings of the 1st International Symposium on Handheld and Ubiquitous Computing, Sep. 1999, pp. 89-101.

Sears, A. et al., "When computers fade: Pervasive computing and situationally-induced impairments and disabilities", Proceedings of the 10th International Conference on Human-Computer Interaction (HCI '03), Marwah: Lawrence Erlbaum Associates, Jun. 2003, pp. 1298-1302.

Schildbach, B. et al., "Investigating selection and reading performance on a mobile phone while walking", Proceedings of the 12th International Conference on Human Computer Interaction with Mobile Devices and Services, Sep. 2010, pp. 93-102.

Soukoreff, R.W. et al., "Metrics for text entry research: An evaluation of MSD and KSPC, and a new unified error metric", Proceedings of the SIGCHI Conference on Human Factors in Computing Systems, Apr. 2003, pp. 113-120.

Strachan, S. et al., "Muscle Tremor as an Input Mechanism", Proceedings of the 17th Annual ACM Symposium on User Interface Software and Technology, Oct. 2004, 2 pages.

Taylor, B.T. et al., "Graspables: grasp-recognition as a user interface", Proceedings of the SIGCHI Conference on Human Factors in Computing Systems.

Van Laerhoven, K. et al., "What shall we teach our pants", Proceedings of the 4th IEEE International Symposium on Wearable Computers, Oct. 2000, pp. 77-83.

Weberg, L. et al., "A piece of butter on the PDA display", Extended Abstracts on Human Factors in Computing Systems, Mar. 2001, pp. 435-436.

Wigdor, D. et al., "TiltText: using tilt for text input to mobile phones", Proceedings of the 16th Annual ACM Symposium on User Interface Software and Technology, Nov. 2003, pp. 81-90.

Wimmer, R., "FlyEye: grasp-sensitive surfaces using optical fiber", Proceedings of the 4th International Conference on Tangible, Embedded, and Embodied Interaction, Jan. 2010, pp. 245-248.

Wobbrock, J.O. et al., "Ability-Based Design: Concept, Principles and Examples", ACM Transactions on Accessible Computing, Apr. 2011.

Wobbrock, J.O. et al., "Analyzing the input stream for character-level errors in unconstrained text entry evaluations", ACM Transactions on Computer-Human Interaction, Dec. 2006, pp. 458-489.

Wobbrock, J.O. et al., "The Aligned Rank Transform for nonparametric factorial analyses using only ANOVA procedures", Proceedings of the SIGCHI Conference on Human Factors in Computing Systems, May 2011, pp. 143-146.

(56) References Cited

OTHER PUBLICATIONS

Wobbrock, J.O. et al., "The performance of hand postures in front- and back-of-device interaction for mobile computing", International Journal of Human-Computer Studies, Dec. 2008, pp. 857-875.

Yamabe, T. et al., "Experiments in Mobile User Interface Adaptation for Walking Users", 2007 IEEE International Conference on Intelligent Pervasive Computing, Oct. 2007, pp. 280-284.

Yatani, K. et al., "An Evaluation of Stylus-based Text Entry Methods on Handheld Devices Studied in Different Mobility States", Pervasive and Mobile Computing, Oct. 2009, pp. 496-508.

Yesilada, Y. et al., "Small-device users situationally impaired by input", Computers in Human Behavior, May 2010, pp. 427-435.

* cited by examiner

USE OF HAND POSTURE TO IMPROVE TEXT ENTRY

CROSS-REFERENCE TO RELATED APPLICATION

This application claims the benefit of U.S. Provisional Application No. 61/735,800, filed Dec. 11, 2012, entitled "SYSTEMS AND METHODS FOR IMPROVED DATA ENTRY ON MOBILE DEVICES" of which is incorporated herein in its entirety by reference.

STATEMENT OF GOVERNMENT INTEREST

This invention was made with government support under grant no. IIS-0811063, awarded by the National Science Foundation (NSF). The government has certain rights in the invention.

BACKGROUND

Touch screen devices have become the dominant platform for mobile computing; however, the lack of tactile feedback on these devices requires a high level of visual attention to select targets accurately. Input is particularly challenging when the user is in motion, a state that can be thought of as causing situational impairments. Situational impairments may be caused by a variety of factors including vibration, divided attention, diverted gaze, body motion, awkward postures, cold temperatures, clothing, rainwater, glare, uneven terrain, ambient noise, or encumbering baggage. The challenges of situational impairments are exacerbated for mobile text entry on virtual keyboards because of the many repeated targeting actions that take place in quick succession.

A significant contextual factors affecting mobile device use may be a user's hand posture with which he or she manipulates a mobile device. Hand postures including grip, one or two hands, hand pose, the number of fingers used, and so on may significantly affect performance and usage of mobile devices. For example, the pointing performance of index fingers is significantly better than thumbs, as is pointing performance when using two hands versus one hand. Similarly, the performance of a user's dominant hand is better than that of his or her non-dominant hand.

DETAILED DESCRIPTION

Figure 1:
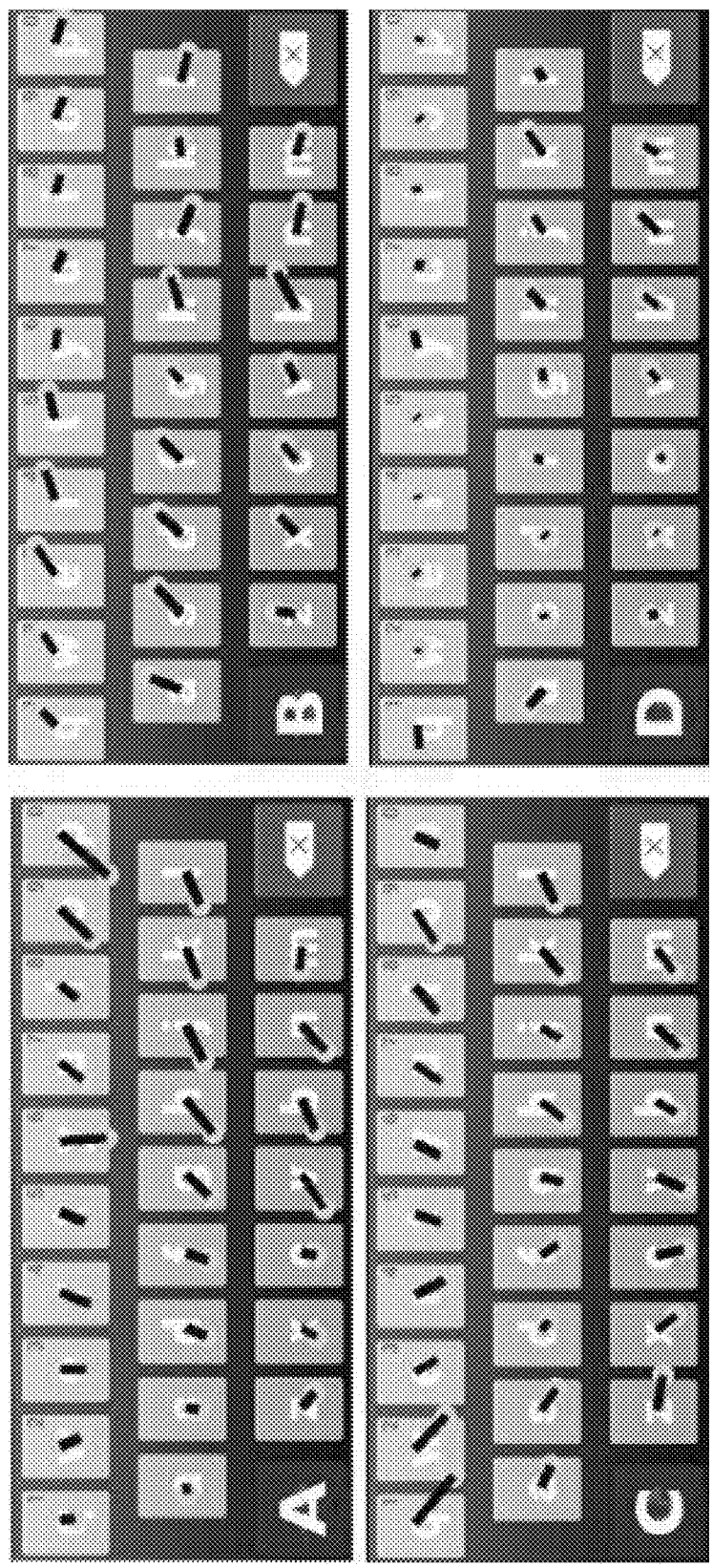
FIG. 1 shows a sample of the variance in touch behavior for a user.

ContextType is a system that uses inference of a user's hand posture to improve text entry of a mobile touch screen device. ContextType switches between various underlying key-classification based on inference about how the user is holding the device while typing without changing the visual layout. ContextType supports the hand postures of typing with 1) two thumbs, 2) just the left thumb, 3) just right thumb, or 4) either index finger. ContextType employs GripSense, which infers hand posture as left thumb, right thumb, or index finger. ContextType also detects two-thumbed hand postures without adding any external sensors to the device. Once hand posture is inferred, ContextType combines a users posture-specific touch-pattern information with a language model to classify the user's touch event as a pressed key.

GripSense is a system that leverages mobile device touch-screens and their built-in inertial sensors and vibration motor to infer hand postures including one- or two-handed interaction, use of digit such as thumb or index finger, or use on a table. GripSense also senses the amount of pressure a user exerts on the touchscreen despite a lack of direct pressure sensors by observing diminished gyroscope readings when the vibration motor is "pulsed."

WalkType is a system that uses a touch screen device's built-in accelerometer to increase text entry accuracy while the user is walking. WalkType compensates for imprecise input by incorporating multiple features computed from the accelerometer data: displacement, acceleration, and inference about the user's movement. Additionally, WalkType uses tap location and the finger travel distance during taps to improve the user's text entry accuracy, features that increase overall accuracy regardless of movement.

1. Context Type

ContextType combines multiple sources of information to classify a user's touch event as a key press. The information includes data about the user's hand posture, the user's touch pattern, and the letter probabilities from a language model. ContextType gives priority to data about the user's hand posture. ContextType uses different models for different hand postures. ContextType infers hand posture uses techniques from GripSense, which can infer the left thumb, right thumb, or either index finger. (See, Goel, M., Wobbrock, J. O., and Patel, S. N., "GripSense: Using Built-In Sensors to Detect Hand Posture and Pressure on Commodity Mobile Phones," Proc. UIST'12.) ContextType extends this functionality by also inferring two-thumbed postures.

1.1 Two-Thumbed Posture Detection

To detect a two-thumbed posture, ContextType uses tap sizes and time elapsed between taps. GripSense differentiates between left and right thumb usage by observing tap sizes. Tap sizes increase relatively as the user tries to touch the farther side of the screen, i.e., when operated with the left thumb, the areas touched on the right side of the screen will be bigger than those on the left side and vice versa. ContextType extends GripSense and infers two-handed posture if the tap sizes in the center of the screen are larger relative to those on either side. ContextType combines tap sizes with the relative difference in time elapsed between taps on either side of the screen. When using one hand to operate the phone, it takes longer to go from one side of the screen to another. Hence, if a tap on one side of the screen is followed by another on the opposite side, the time difference will be larger than the average time difference because the thumb/finger needs to travel farther. In contrast, when operated with two thumbs, the time difference between taps on opposite sides of the screen will be significantly less.

1.2 Touch Pattern Model

ContextType personalizes the underlying keyboard layout by modifying the virtual location of the keys according to the user's typing behavior (i.e., the visual layout of the keyboard remains static). ContextType computes a bivariate Gaussian distribution (See, Findlater, L. and Wobbrock, J., "Personalized input: Improving ten-finger touchscreen typing through automatic adaptation," In Proc. CHI'12, 815-824, May 5-10, 2012) for each key and centers each key at the centroids of predicted key-presses that are personalized for each user. Considering that touch behavior varies not only across users but also across hand postures for the same user, ContextType uses separate models for different hand postures. FIG. 1 shows a sample of the variance in touch behavior for a user. ((A) Left Thumb, (B) Right Thumb, (C) Index Finger, (D) Two Thumbs.) In case of single thumbs, the user tended to bias towards the side of the thumb because of its limited reach.

1.3 Language Model

In some embodiments, ContextType uses a 5-gram letter model. (See, Goodman, J., Venolia, G., Steury, K., and Parker, C., "Language modeling for soft keyboards," In the Proc. IUI'02.) The model was trained on the Brown corpus, consisting of American English from a variety of sources. (See, Kucera, H. and Francis, W. "Computational Analysis of Present-Day American English," 1962.) One of the most important aspects of any language model is how probabilities are smoothed to account for limited data. ContextType employs the Modified Kneser-Ney method, which has been successfully used by Goodman in language modeling for soft keyboards. (See, Chen, S. F. and Goodman, J., "An empirical study of smoothing techniques for language modeling," Proc. Association for Computational Linguistics, 1996.)

1.4 Combining Touch and Language Models

ContextType combines touch and language models by calculating probabilities for each key. The most likely intended key, $k^*_i$, is given by:

$$k^*_i = \mathrm{argmax}_{k_i} p_L(k_i|h) \cdot p_T(k_i|l)$$

where $p_L$ is the language model probability, $p_T$ is the touch model probability, $k_i$ is the probability for each key, h is the language model history (last 4 entered characters in case of 5-gram letter model), and $l \in R^2$ is an x and y coordinate pair denoting the last touch location on the screen.

1.5 Data Collection

ContextType uses touch models built based on typing data collected from various users. The typing data was collected using a a custom data collection application for the Android OS and used a Samsung Galaxy Nexus phone. The interface was designed to capture the user's natural typing pattern. Thus, the interface did not inform users of their mistakes and the correct letter was always displayed. The interface also included a swipe from right-to-left that removed the last character typed. The users were instructed to use this when they felt that they had made an error. The lack of tap-location feedback did result in some noise in the data. Thus, the outliers were removed during post-processing by filtering out taps that landed outside the Euclidean bounds of the intended key or its immediate neighbors. The users were asked to enter 30 phrases in each of the 4 hand postures. The order of postures was counterbalanced. Short phrases of English text from MacKenzie and Soukoreff's phrase set were used. (see, MacKenzie, I. S. and Soukoreff, R. W., "Phrase sets for evaluating text entry techniques," Proc. CHI'03 EA.) Apart from these phrases, every fifth phrase was a randomly select pangram from a lest of 35 pangrams to ensure sufficient representation of all letters of English alphabet.

2. GripSense

GripSense is a system that uses a combination of the touchscreen and the built-in inertial sensors (gyroscope, accelerometer) and built-in actuators (vibration motors) already present on most commodity mobile phones to infer hand postures and pressure. GripSense detects hand postures over the course of a small number of interaction steps (e.g., tapping, swiping the screen). It infers postures like the use of an index finger, left thumb, right thumb, which hand is holding the device, or whether the phone is lying on a flat surface. GripSense performs this sensing by measuring a device's rotation, tap sizes, and the arc of swiping motions. GripSense additionally leverages the built-in vibration motors to help infer the amount of pressure being applied to the screen when interacting with the phone, which can be used to enable alternate interaction techniques with mobile devices that have no additional hardware for pressure sensing. As an example. GripSense allows users to zoom-in and zoom-out of maps using pressure input, in addition, GripSense is able to detect when the phone is being squeezed, which could be used to quickly silence a phone while in a pocket.

GripSense uses multiple sources of information to detect a user's hand posture and the amount of pressure exerted in a variety of these postures. Among these sources is the data from device's built-in gyroscope. In case of hand posture detection, the gyroscope is used to measure the direction and amount of rotation of the device in all three axes. For the detection of exerted pressure, the gyroscope is used to measure specific damping characteristics of touch- and motor-induced vibrations. Another source of information is touchscreen interaction data. Table 1 is a summary of inferences made by GripSense and when and which features were used for each of them.

TABLE 1

| Inference | Features Used | Sensor Event | Latency |
| --- | --- | --- | --- |
| Table vs. Hand | Gyroscope (Low frequency in all axes) | Touch Down | 1 |
| Thumb vs. Index Finger | Gyroscope (Low frequency in x- and y-axis) | Touch Down | 3 |
| | Swipe Shape | Touch Up | |
| | Touch Size | Touch Down | |
| Left Thumb vs. Right Thumb | Gyroscope (Low frequency in y-axis) | Touch Down | 5 |
| | Swipe Shape | Touch Up | |
| | Touch Size | Touch Down | |
| Pressure in hand | Gyroscope (Low Frequency) | Touch Down | 1 |
| | Gyroscope (High Frequency) + Motor | | |
| Pressure on table | Gyroscope (High frequency + Motor | Touch Down | 1 |
| Squeeze | Gyroscope (High frequency + Motor | Held in Hand | 0 |

2.1 Inferring Hand Posture

Figure 2:
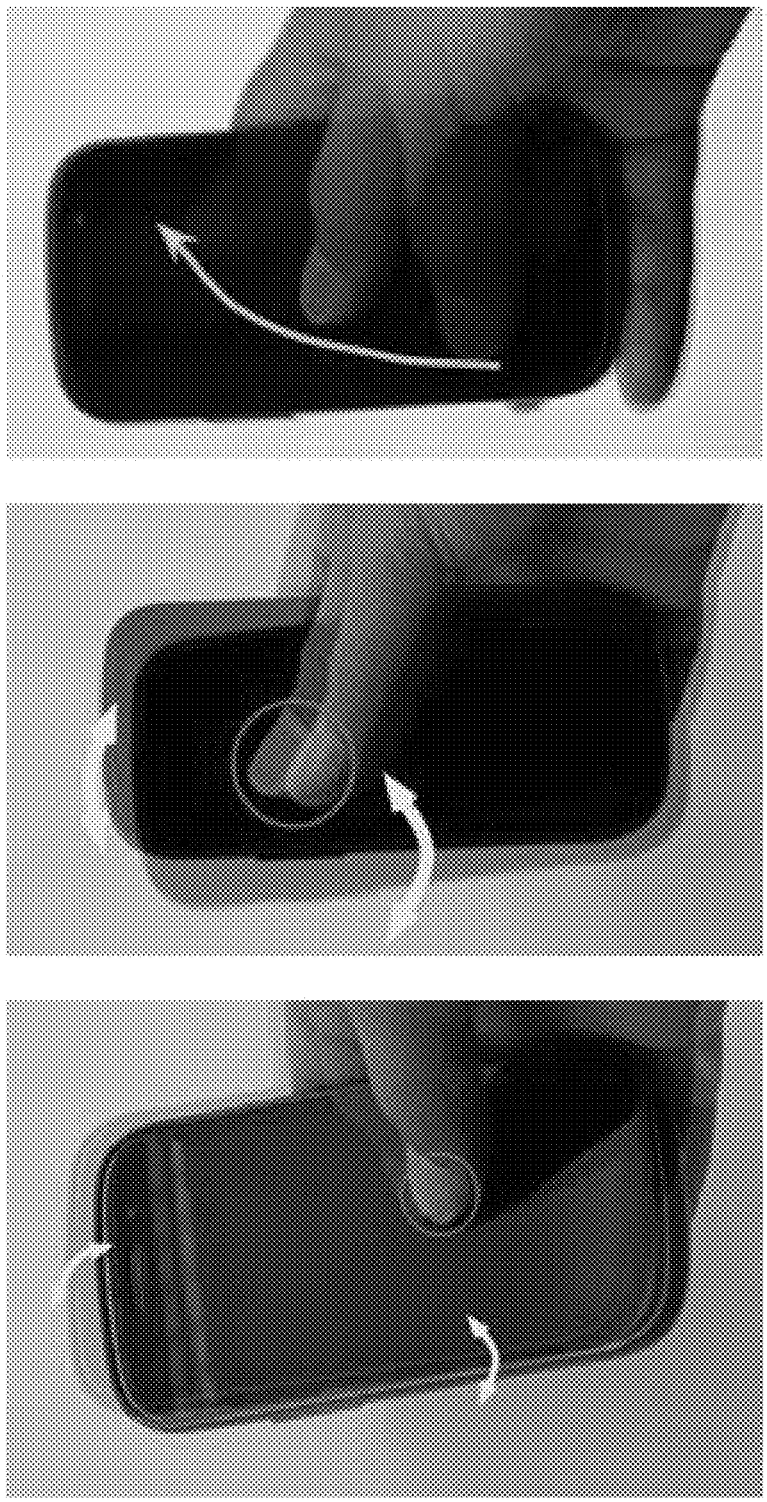
FIG. 2 illustrates the rotation, touch size, and swipe features.

GripSense uses touchscreen interaction and device rotation information to infer whether the phone is (a) in a user's left hand and operated with left thumb, (b) in a user's right hand and operated with right thumb, (c) in either hand and operated with the index finger of the other hand, (d) on a flat surface, or (e) being only grasped by the user and not operated, referred to as hand postures. GripSense uses a combination of three features: (1) relative variance in rotation, (2) change in touch size, and (3) direction of arc for finger swipes. FIG. 2 illustrates the rotation, touch size, and swipe features. These features were extracted on a Samsung Nexus S smartphone running Android OS 2.3.

2.1.1 Rotation of the Device

The first feature is the rotational movement of the device as the user touches the screen. In a one-handed interaction, the phone rotates in response to touches at the top of the screen more than it does to touches at the bottom of the screen (FIG. 2, right). There is significant rotation in x- and y-axis and larger touch size when the far quadrant of the screen is touched (FIG. 2, center). This is to compensate for the limited range of the thumb; fingers move the device as the thumb extends to reach the top of the screen. In contrast, touches at the bottom of the screen result in less angular motion because that area is usually within the thumb's range. There is minimal device rotation in x- and y-axis, and smaller touch size when the user touches nearby with the thumb (FIG. 2, left). The rotation and the shape of a swipe with the right and left thumb are mirror images. When the user interacts using their index finger, there is no difference in the angular motion from touches at the top or the bottom of the screen. If the device is on a table then there is no change in any of these parameters before the touch event is registered.

GripSense stores the angular velocities around the x-axis sampled at 1 kHz from the gyroscope in a quarter-second buffer. The data in the buffer is passed through a low-pass filter to isolate the low frequency angular velocities. GripSense records the last two angular velocities observed for touches in the top third of the screen and the bottom third of the screen. If the difference in variance of angular velocities for touches in the top is five times greater than for touches in the bottom of the screen, GripSense assumes that it was thumb-based interaction. If the difference in the variances does not exceed the threshold for three consecutive touches, then GripSense biases the final decision towards selecting "index finger."

Similarly, when a user holds the phone in theft left hand and interacts with their thumb, touches on the right of the screen cause more angular motion than touches nearer to the palm, again because of the compensation for the limited motion range of the thumb. In the case of the right hand, more motion is seen from touches on the left of the screen. If a thumb-based interaction is inferred, GripSense uses a similar approach as before, except for logging the variance in the y-axis of the gyroscope for touches on the left third of the screen and the right third of the screen. If the variance in angular velocity of the last two touches on the left side is greater than that on the right side, then GripSense assumes the phone is in the right hand (left hand if the variance on the right is greater). Moreover, if the difference in angular velocities is more than ten times greater in consecutive touches, GripSense sets a "high confidence flag" which is used to bias the final decision towards using this feature.

2.1.2 Touch Size

The second feature is based on the change of size of touch in different regions of the touch screen. In one-handed interaction when the user interacts with the left and right sides of the screen, the size of the touch changes because of the shape of the thumb and rotation of the device in the user's hand. The touch size on the same side as the thumb will be smaller than the touch size on the far side away from the thumb.

For this feature, GripSense divides the screen into six (2×3) parts and keep track of last two touch sizes. The Android platform provides a method to get the touch size on the screen. This method is supported by most Android smartphones available in the market. GripSense compares touch sizes in the left third and right third of the screen for the same third of the screen height. If the difference in the mean of the touch sizes is more than 25%, GripSense biases the system towards a thumb-based interaction. If the larger tap size is on the left side, then the system believes it is right thumb, and vice versa. Moreover, if the difference in touch sizes is more than 40% for consecutive touches, the heuristic sets a "high confidence flag." If the difference is less than 25%, it biases toward index finger-based interaction.

2.1.3 Shape of the Swipe Arc

This feature is only applicable when the user swipes on the screen. Because of the shape and position of the thumb, users often draw an exaggerated arc instead of a relatively straight line. GripSense uses this arc as our "signal" to detect the user's hand posture. While using the phone with the index finger there is no consistent arc. However, with the thumb there is a consistent, exaggerated arc to the right or left depending on which thumb is being used.

If the difference in coordinates of the start and end position of a vertical swipe are more than 5% of the screen resolution, GripSense biases itself towards one of the two thumb postures. Even so, sometimes a thumb-based swipe does not result in an arc. Instead, the phone experiences angular motion in the hand. For example, a right-handed swipe from bottom to top results in a counterclockwise rotation. These two phenomena combine to form a robust heuristic for handling posture detection in the case of swipes. As with the other two heuristics, the final intra-heuristic decision is made when the system biases toward the same posture twice in a row.

2.1.4 Making the Final Decision

If swipes are present, GripSense uses a majority voting on the output of each heuristic to decide the posture. If all three votes disagree, the posture is marked as "unknown." In the absence of swipe, a final decision is made only if both touch size and rotation heuristics agree or if the "high confidence flag" in one of the heuristics is set. If both heuristics come up with different decisions, then the system chooses the heuristic with a "high confidence flag." If both confidence flags are set or no confidence flags are set with disagreement, the posture is set to "unknown."

2.2 Detecting Pressure Applied to the Touchscreen

GripSense uses the gyroscope and vibration motor to classify the user's touchscreen touches into three pressure categories: light, medium and heavy. If the built-in vibration motor is triggered when a user touches the screen (similar to what is already done in a number of smartphones to provide haptic feedback), the user's hand absorbs a portion of these vibrations. This vibration absorption is proportional to the amount of pressure being applied to the screen. This damping effect is measured using the on-device gyroscope. GripSense primarily looks for the damping of vibrations induced by the vibration motor. As the amount of force exerted by the user on the touchscreen increases, there is a subtle oscillating motion between the user's thumb and the four fingers that rest on the back of the device (see the low pass signal in FIG. 3). This oscillation occurs because the user's thumb and fingers try to compensate continually for pressure exerted and this oscillation has much lower frequency compared to that induced by the vibration motor. This subtle motion is not dependent on the vibration motor. In order to make a robust classification of a user's touch intensity, GripSense uses both of these features. The top gyroscope signal is when user presses light, then hard, then waits for a second and presses hard and soft again.

GripSense leverages the subtle shaking of the phone as a user's thumb or finger (depending on the posture) and hand in which the phone is held try to compensate for pressure exerted by each other. An effective combination of these touch-induced vibrations with damped motor-induced vibrations give a much more authentic fine-grained and continuous proxy of pressure exerted on the screen.

Figure 3:
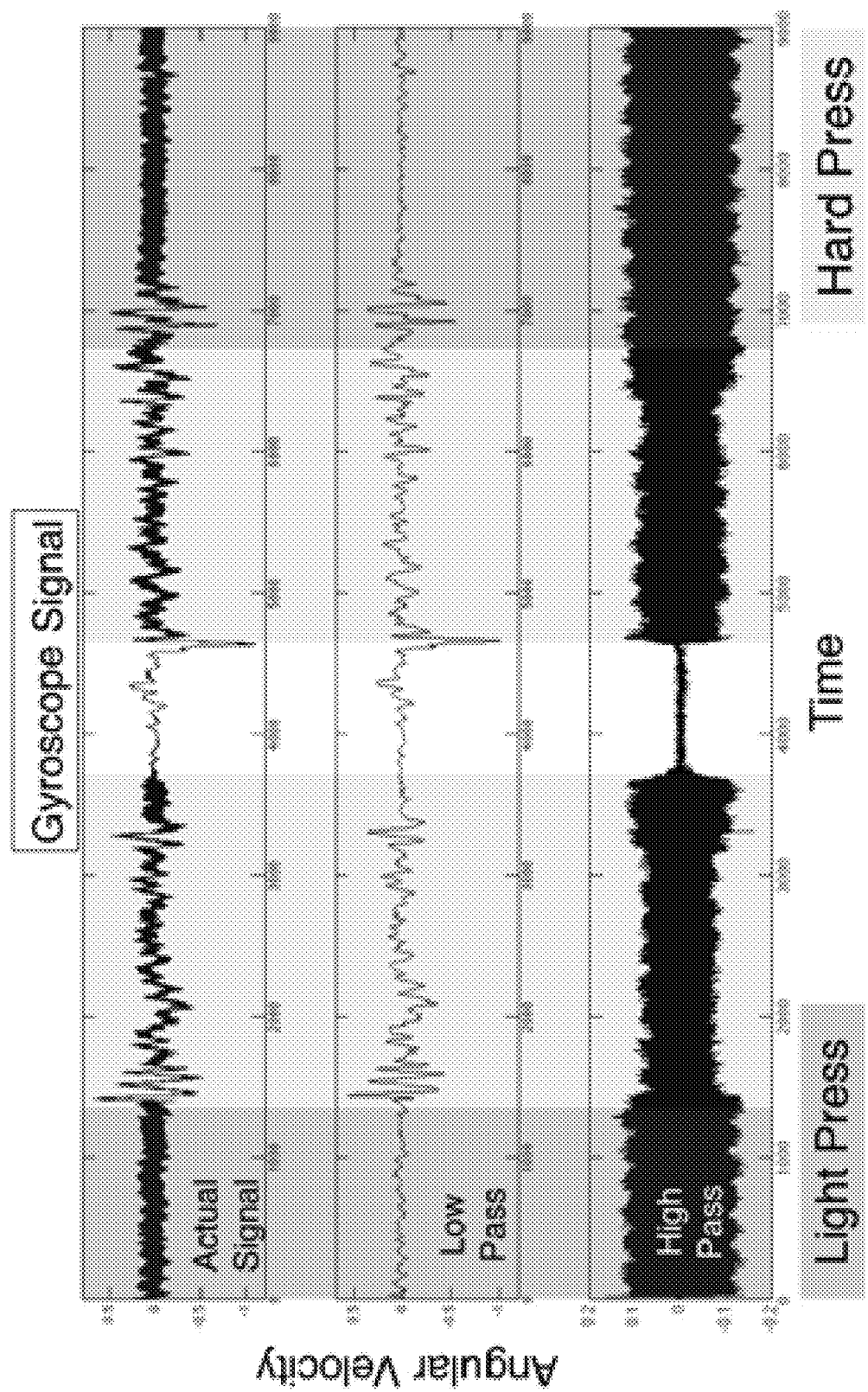
FIG. 3 illustrates the gyroscope signal versus angular velocity.

GripSense employs a custom application on an Android Nexus-S smartphone, wherein any touch triggered the phone's built-in vibration motor. GripSense then gathered angular velocities around the three axes through the built-in gyroscope with a 1 kHz sampling rate. FIG. 3 illustrates the gyroscope signal versus angular velocity. The top plot shows the gyroscope signal when the user presses light, the hard, then waits for a second and presses hard and soft again. Touch-induced vibrations were obtained by passing the signal through a low pass filter The middle plot shows the lower frequencies generated from touch-induced vibrations increase with increase in pressure. The motor-induced vibrations were obtained by passing the original signal through a high pass filter. The bottom plots shows that motor-induced vibrations are diminished as the amount of pressure exerted increases. The bottom plot makes it clear that in the case of a hard press, there is an exaggerated damping effect due to vibrations absorbed by the user's hand. GripSense quantifies this damping using the 90th percentile of the high-frequency component of the observed signal. For the low frequency signal, GripSense quantifies the movement of the phone using the signal variance.

The amount of motor-induced vibrations absorbed by the hand and thumb or finger is also dependent on the location of touch on the screen. Hence, GripSense divides screen into a 4×6 matrix in portrait mode and added "touch zone" as another feature for pressure level classification. GripSense buffers the gyroscope data at 1 kHz in a 500 ms buffer and analyze it every 250 ms. The data then passes through low pass and high pass filters and appropriate variances and 90th-percentiles are calculated. These features, along with touchscreen features (zone and size), were used to classify to pressure level using the Weka machine learning toolkit. Weka was used to generate J48 Decision Trees with pruning confidence set to Weka's default (0.25)

Figure 4:
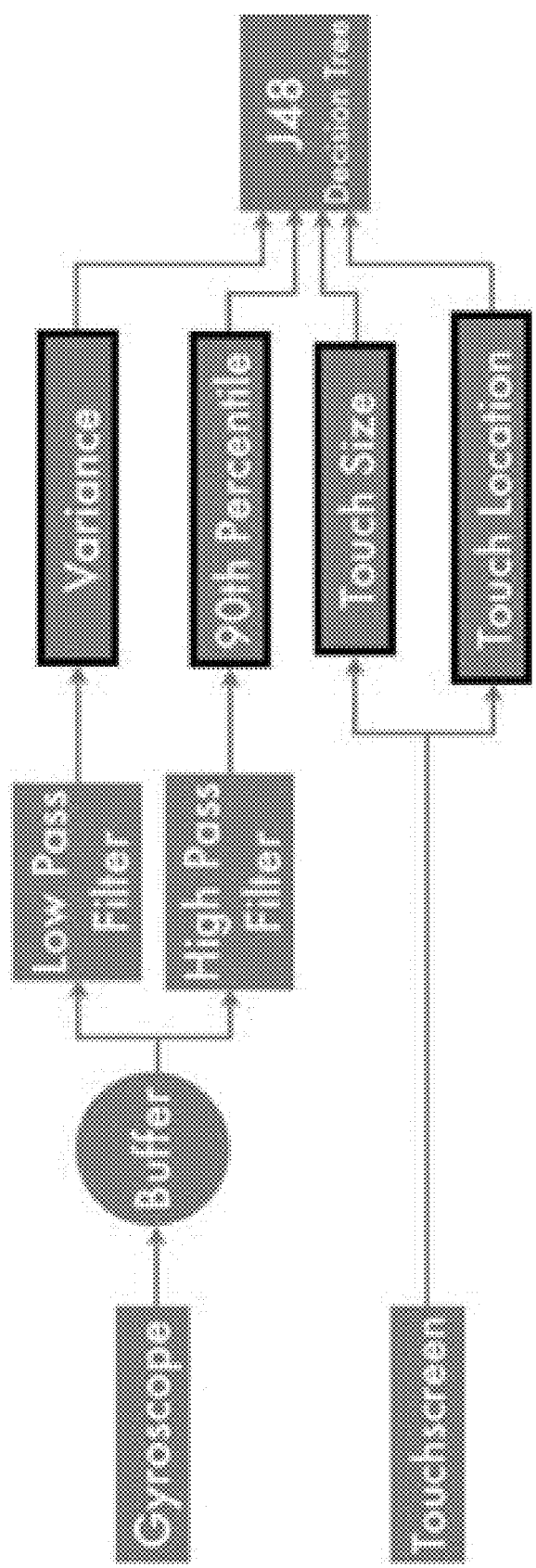
FIG. 4 is a block diagram of the major components of GripSense's pressure detection module.

FIG. 4 is a block diagram of the major components of GripSense's pressure detection module. Low frequency variance, 90th percentile of higher frequencies, touch size and location are the features used for classification.

2.3 Squeeze and Grasp Gestures

Using similar techniques as for quantifying pressure exerted on a touch screen, GripSense uses a method to detect squeeze or grasp gestures. For example, quickly GripSense can be used to silence a phone while it is still in a pocket or in a purse by squeezing it and without the need for fully retrieving the phone. Although grasping provides a significant amount of damping to the motor-induced vibrations, there was no significant variance in low frequency component of the gyroscope data; therefore, 90th percentiles of only higher frequencies were used as features for Weka's J48 decision trees.

2.4 Conclusions

There are circumstances where it is difficult to use multiple fingers on a mobile device. Users often do not have both hands available for interaction. GripSense can be used with a map application in which user could zoom in by pressing harder on the screen, and could lightly press to zoom out. Pressure input information may also be used to change letter case on a touchscreen keyboard. Users can press harder to enter uppercase letters and press lighter to enter lowercase letters.

The GripSense algorithms have been implemented on a Samsung Nexus S running the Android OS. Although the basic premise would remain the same, the pressure detection algorithms might need to be adjusted somewhat for different phones because of different physical characteristics. The variability of the sampling rate and resolution of different devices may also require algorithmic adjustments on some phones. Current inertial sensors present on commodity mobile devices are not high resolution and the algorithms may benefit from improved resolution.

The use of the built-in motor to produce vibration means that almost half of the features are coming from a relatively high-frequency source. Hence, GripSense's pressure detection does not suffer from the usual limitations of inertial sensor-based techniques like the presence of external sources of vibration, etc.

The combination of touch-induced and motor-induced vibrations means that these techniques can be reliably implemented when the device is on a flat surface. Hence these algorithms can be ported to tablets as well, which are used relatively more on a desk when compared to a smart phone. Modern game controller manufacturers can also leverage these techniques with a simple software upgrade to add pressure sensitivity to their devices, as game controllers already have vibration motors and inertial sensors. GripSense may also be used to infer more than three levels of pressure. A more continuous regression to pressure is possible that have more than just quantized levels of pressure.

3. WalkType

The lack of tactile feedback on touch screens makes typing difficult, a challenge exacerbated when situational impairments like walking vibration and divided attention arise in mobile settings. WalkType is an adaptive text entry system that leverages the mobile device's built-in tri-axis accelerometer to compensate for extraneous movement while walking. WalkType's classification model uses the displacement and acceleration of the device, and inference about the user's footsteps. Additionally, WalkType models finger-touch location and finger distance traveled on the screen, features that increase overall accuracy regardless of movement.

WalkType is a system that uses a touch screen device's built-in accelerometer to increase text entry accuracy while the user is walking. WalkType compensates for imprecise input by incorporating multiple features computed from the accelerometer data: displacement, acceleration, and inference about the user's movement. Additionally, WalkType uses tap location and the finger travel distance during taps to improve the user's text entry accuracy, features that increase overall accuracy regardless of movement.

3.1 Model-Building

Along with accelerometer data, WalkType uses tap locations and tap travel distance to better predict the intended key. The Weka machine learning toolkit (http://www.cs.waikato.ac.nz/ml/weka) was used to generate two J4.8 Decision Tree models with pruning confidence set to Weka's default (0.25). For classification, the first model used time-domain accelerometer data between taps and the second model used the pattern of accelerometer data generated from the three axes due to the phone's motion while walking. The final WalkType system combined output from both of these models along with a simple Euclidian model. The composite model performed better than individual models. For clarity, the term Euclidian model refers to a simple key-press classification model that takes as input the (x, y) coordinate of a finger-touch and returns the letter whose corresponding key's visual bounds contain those coordinates.

WalkType Collect is a custom data collection application built for the iPhone 3GS that records the device's movement using the on-device low-noise tri-axis accelerometer. To elicit natural typing patterns and to not want user to be overly concerned with the accuracy of their input, the approaches of Gunawardana (Gunawardana, A., Peek, T. and Meek, C., "Usability Guided Key-Target Resizing for Soft Keyboards," Proc. IUI'10. New York: ACM Press, 111-118) and Findlater (Findlater, L., Wobbrock, J. O. and Wigdor, D., "Typing on Flat Glass: Examining Ten-finger Expert Typing Patterns on Touch Surfaces," Proc. CHI'11, New York: ACM Press, 2453-2462) were followed and Collect's keyboard was created in such a way that it only gave the user feedback that a tap had occurred, but not where it occurred or what key had been hit. To convey this feedback, a small cursor moved under the phrase as the user typed. If the user realized that they were off by a character or two while typing, they could swipe from right to left anywhere on the screen to delete one tap at a time. Users were instructed to try to delete their tap when they knew they had made an obvious mistake or when they felt they were off by a character or two. The users were requested not to go back through the whole phrase in order to correct a supposed error. Users were asked to enter 50 phrases in 2 postures, sitting and walking, while holding the device with both hands and typing with both thumbs. The order of postures was counterbalanced and users were randomly assigned to orders. Short phrases of English text from MacKenzie and Soukoreff's phrase set were used. (MacKenzie, I. S. and Soukoreff, R. W., "Phrase sets for evaluating text entry techniques," Extended Abstracts, CHI'03, New York: ACM Press, 754-755.) Apart from these, every fifth phrase was a randomly selected pangram from a list of 35 pangrams to ensure sufficient data for all letters of the alphabet.

The lack of tap-location feedback meant that users made mistakes while entering text, which added noise to the data. Thus, outliers were removed during post-processing by eliminating all taps that landed outside the Euclidean bounds of the intended key or its immediate neighbors. About 2.5% taps were filtered out in this process.

The logs from Collect contained tap-start and tap-end locations, amount of travel while tapping, the time interval between taps, the intended key, and temporal accelerometer data. The touch-screen-based features (tap location, tap travel and time elapsed between taps) form the base set of classification features used in the models. Tap travel and time elapsed was included in this set based on observations made while developing Collect. For tap travel, at times, the tap-start and tap-end locations were not the same, yielding a potential feature to increase classification accuracy. For time elapsed, typing speed appeared to impact the users input accuracy: the tendency to type the wrong key was relatively low when typing slowly compared to more quickly.

3.2 Displacement and Acceleration Model

One of the major reasons for inaccuracy in typing while walking is the general movement of the phone and its displacement from a relatively stable location with respect to the user. The Displacement and Acceleration Model improves tap accuracy by incorporating acceleration features in all three axes, and magnitude and direction of displacement in the z-axis. To calculate these features, the data from the smartphone's on-device accelerometer was first passed through a low-pass filter to remove noise. This model also includes the base set of features.

To calculate the acceleration features, the filtered accelerometer data was resampled to 10 samples between two consecutive taps. This sampling rate was selected as it gave reasonable resolution and did not overly increase the number of attributes for the classifier. These 10 samples of (x, y, z) values constitute 30 features for the model. When dealing with accelerometer data, it is often necessary to compensate for gravitational pull on the three axes. However, this compensation was unnecessary because phone orientation stays relatively constant while typing.

For the displacement magnitude and direction features in the z-axis, the mean acceleration was subtracted from the filtered data and then double-integrated using the cumulative sum. The direction in which the phone moved in the z-axis was also calculated. To do so, the device's instantaneous acceleration was compared with the moving mean acceleration of the device. If the instantaneous acceleration was less than the mean, the device was moving forward. Otherwise, it was moving backward.

3.3 Walking Pattern Model

Figure 5:
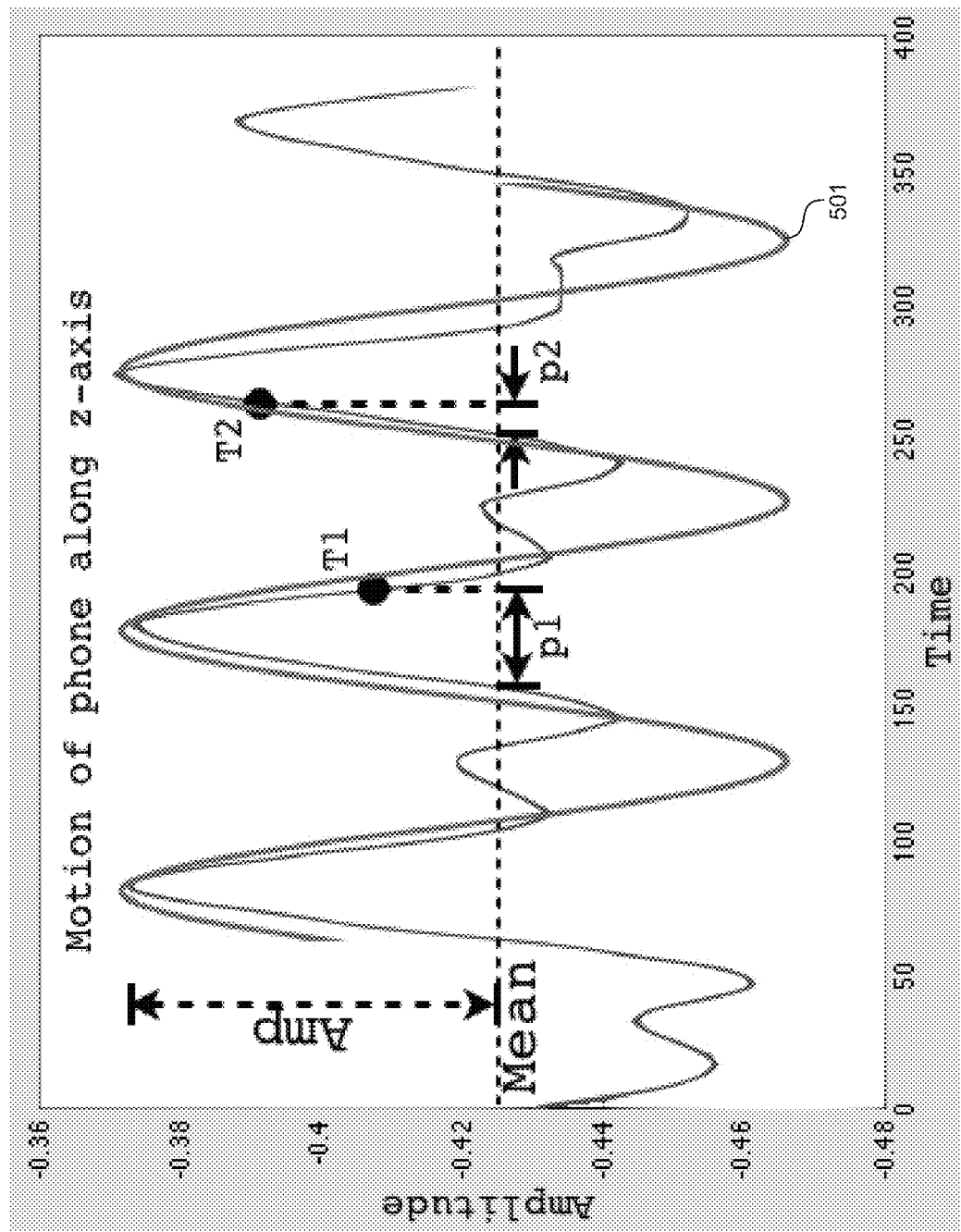
FIG. 5 shows motion of the device along the z-axis as a user walks.

The Collect data indicated that the phone oscillated in a largely repeatable pattern while a user was walking and typing. FIG. 5 shows motion of the device along the z-axis as the user walks. The Walktype Pattern Model leverages the on-device accelerometer to obtain this pattern in all three axes. In addition to the base set of classification features, it incorporates four new features per axis.

To make the model adaptive to different walking speeds, the dominant frequency (e.g., wave 501) of the user's motion and its mean amplitude from all three axes was calculated. This gives a proxy for detecting changes in the user's speed and intensity of movement. To calculate the instantaneous dominant frequency, the Fast Fourier Transform (FFT) of the accelerometer signal was taken and the frequency with the maximum amplitude was found. This frequency and amplitude constitute the first two features. For the third feature, the direction of the last mean crossing before the current tap gives a measure of the direction in which the device is moving. Finally, to pinpoint where in the pattern a tap event occurs, the elapsed time since the accelerometer signal crossed the mean value of the signal was used. T1 and T2 are two instances of taps; p1 and p2 are the elapsed times since the signal crossed the mean.

Figure 6:
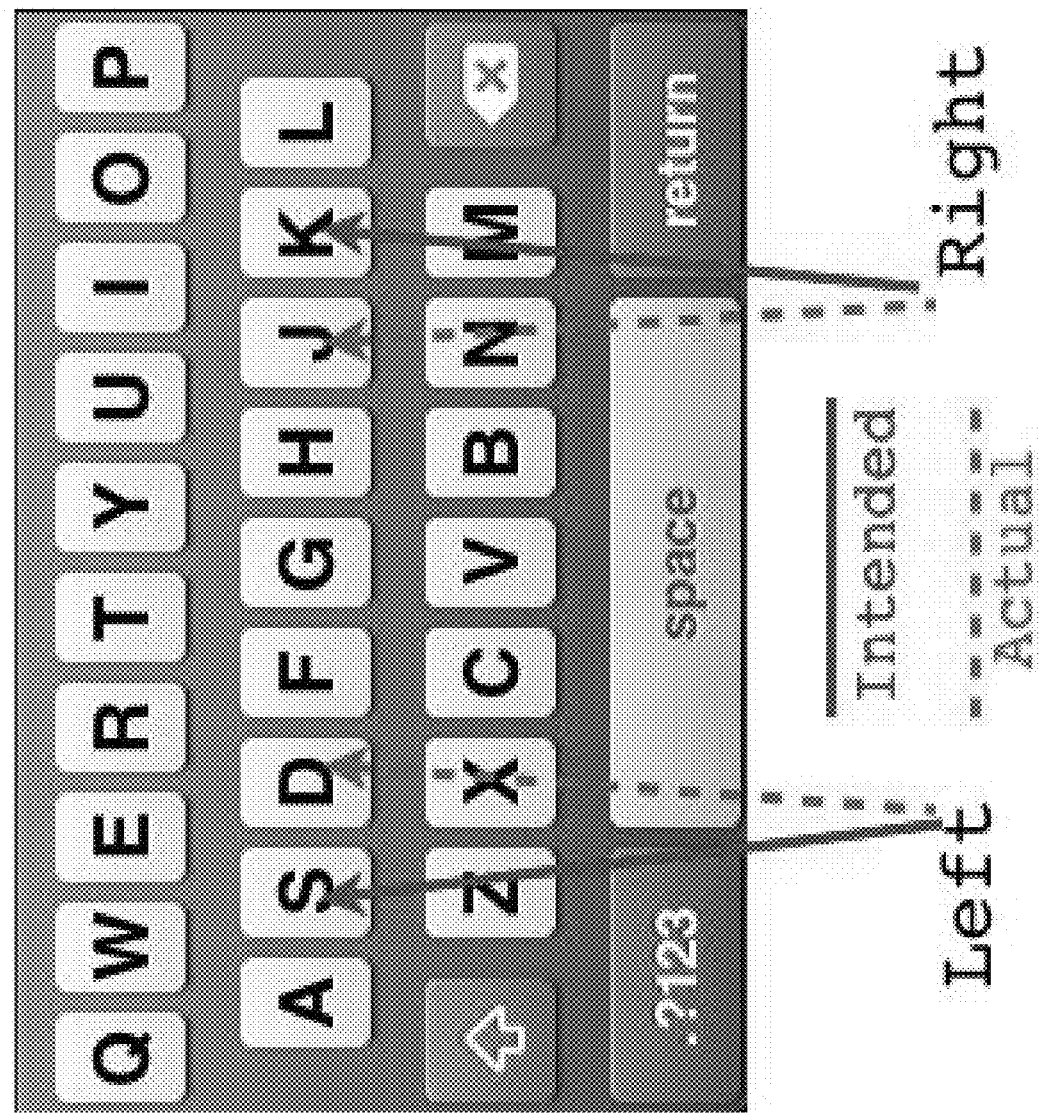
FIG. 6 illustrates that a tap shifts to the left or right as a users left or right foot strikes the ground.

These features in the x-axis are particularly useful in detecting the user's footstep pattern. When users' feet hit the ground, their taps tended to shift slightly towards the center of the keyboard. A shift to the left was more common when the left foot hit the ground, and a shift to the right was more common when the right foot hit. FIG. 6 illustrates that a tap shifts to the left or right as a user's left or right foot strikes the ground. Analysis as shown in FIG. 5 on the x-axis data can be used to detect which foot strikes the ground. If the current x-axis data is less than the mean, then the user's left foot has landed, and vice-versa for the right foot. Because the effect of the foot-strike on the user's accuracy would attenuate over time, the time since the last foot hit the ground was calculated. This calculation was performed in the same way as for the z-axis.

The classifier was provided with the tap location on the screen, the direction in which the phone is going in y- and z-axes, and the last foot that struck the ground. The classifier was also provided three temporal components denoting time since the last change in direction in the three axes.

3.4 Combined WalkType Model

Figure 7:
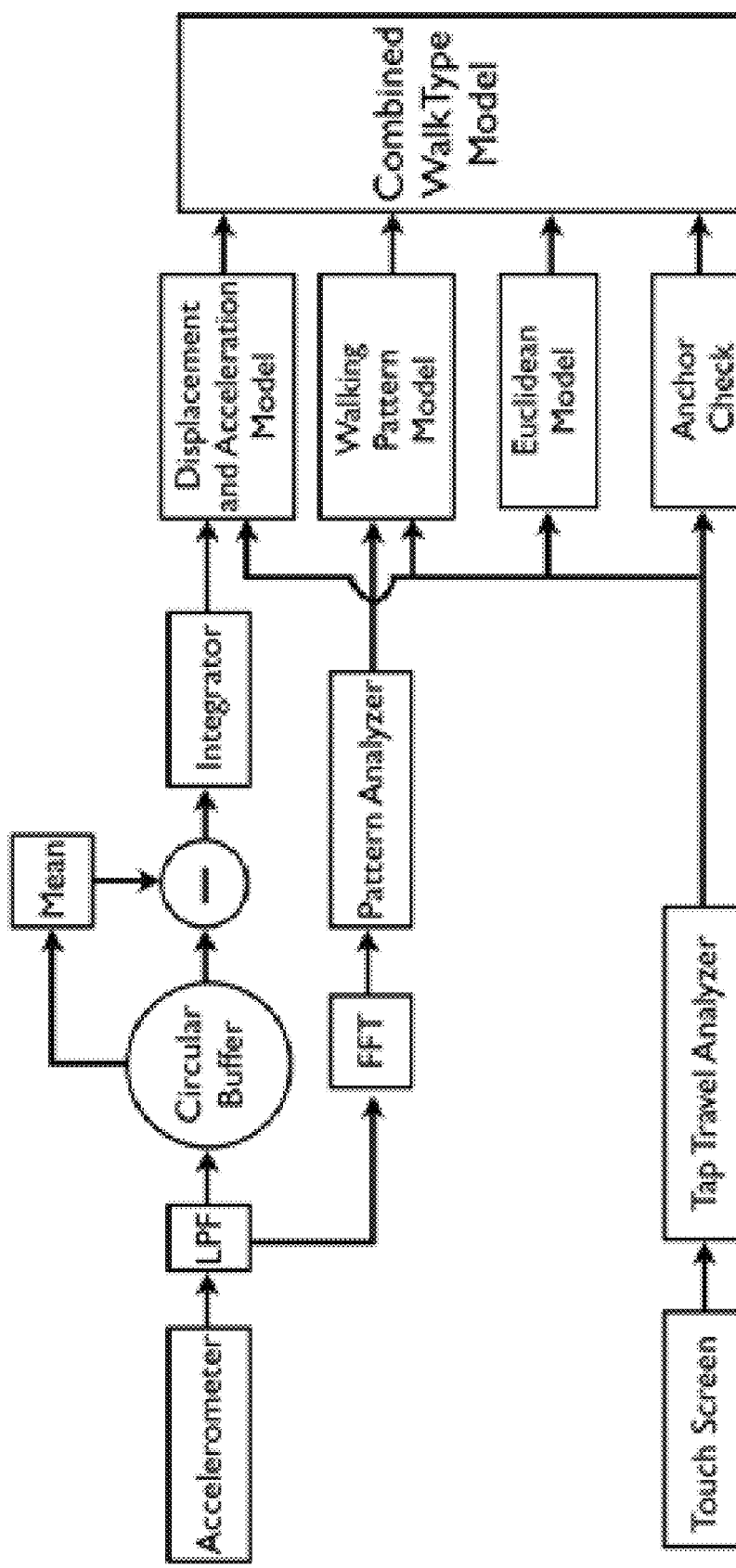
FIG. 7 shows a block diagram of WalkType's Model Building phase.
Figure 8:
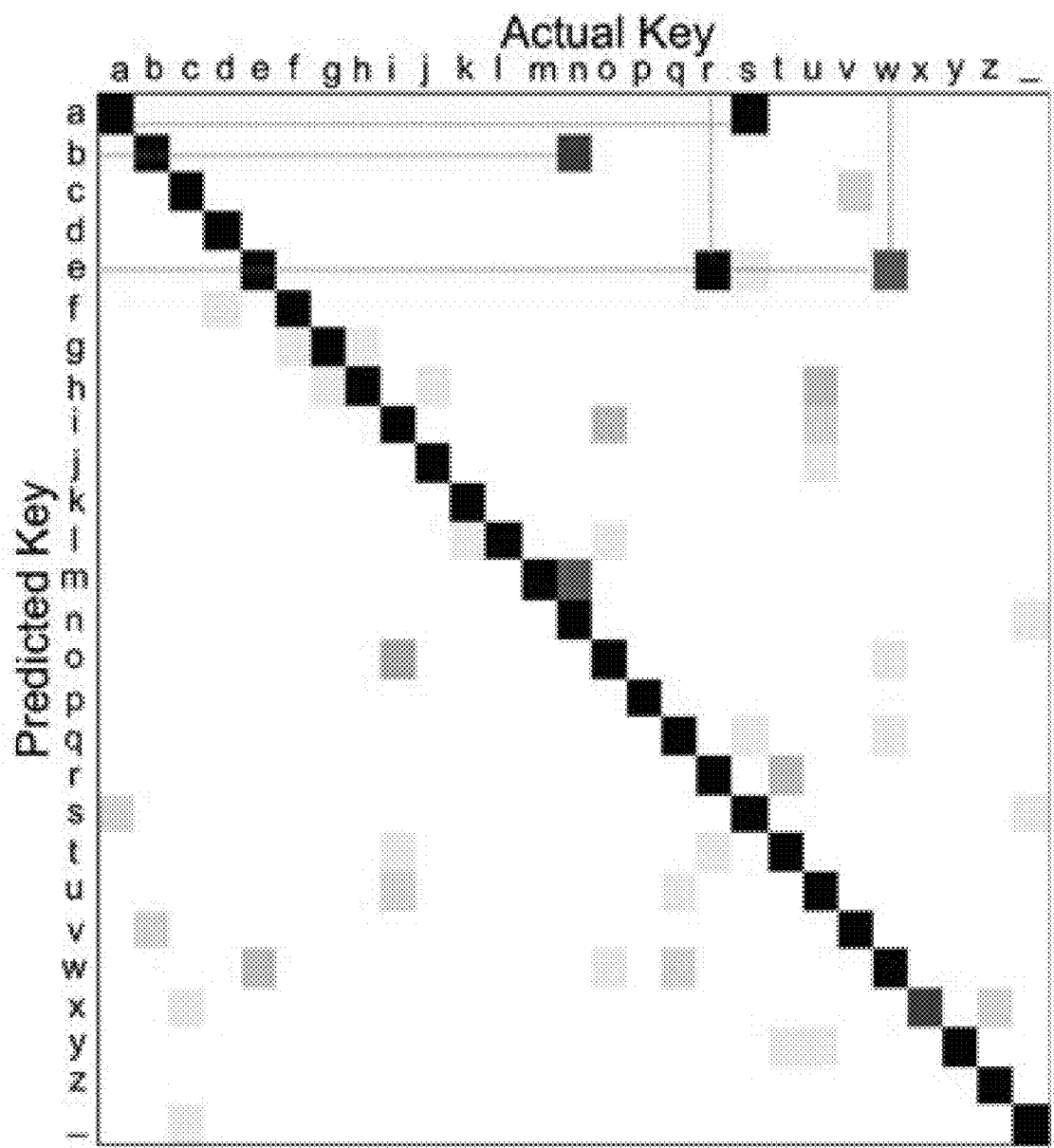
FIG. 8 illustrates a confusion matrix for adjacent keys.

The Combined WalkType Model is a composite of the three sub-models: the Displacement and Acceleration Model, the Walking Pattern Model, and the Euclidean Model. A majority voting approach is used, whereby for each finger-touch, the key selected by at least two of the three internal models is output to the text stream. When all three models disagree, the Walking Pattern Model prevails, since it model performed the best in isolation on the Walk-Type Collect data. FIG. 7 shows a block diagram of Walk-Type's Model Building phase. The Euclidian Model is included because, although classification accuracy was high for both of the accelerometer-based models, some keys become major sources of errors as they got masked by adjacent keys. FIG. 8 illustrates a confusion matrix for adjacent keys. More frequently occurring key dominates adjacent keys, for example, "s" is dominated by "a", "r" and "w" are dominated by "e." To counter this problem, the two models were combined with the Euclidean model. The Euclidean model selects the key containing tap location. Although simple and non-adaptive, this model increases the probability of less-frequently occurring keys like "w" being correctly classified.

The Combined WalkType model also incorporates key-target anchoring. (See, Gunawardana.) After incorporating the three models, there were still taps that, although clearly landing in a key's center, did not get classified correctly. Gunawardana addressed this issue in the context of adjusting key-press probabilities based on a language model. Their work demonstrated that anchoring some part of the key increases overall typing accuracy. The Combined WalkType defines an anchor area in the middle of each visual key; a tap within that anchor area bypasses the classification models and instead returns the visual key. The central 20% along the x-axis and 50% along the y-axis of each key was reserved as the anchor area.

3.5 WalkType Online

All simulations in the previous section were run offline with Weka. The final step in the process of creating Walk-Type was to port the model to an iPhone 3G for online use and evaluation. To do so, the classification models generated by Weka into the Phone were ported and then their operations were optimized and synchronized to work in real-time. The online version of WalkType first filters the accelerometer data, and then sends it to the Combined WalkType Model for classification.

3.6 Conclusions

The text entry improvements obtained by leveraging the accelerometer suggest a similar approach may be useful for mobile interaction more broadly. Stabilizing input with techniques similar to WalkType's, and making the device aware of users' movement patterns and gait may, for example, be useful in accounting for vibrations when users are trying to press a button or move a slider control.

Additional sensors may also be useful in further improving WalkType's classification model. Only data from the accelerometer was used to infer device position and rotation. An extension may be to use the built-in gyroscope as it may be better suited for inferring rotation.

Personalization might also be used for WalkType. The WalkType training data indicates that personalized models, where the system is trained only on one user's data, may increase classification accuracy over models generated from data from all users.

The model-building data indicates users were regularly off by a character when they tried to tap the keys on the borders of the screen, like "A", "Q", SPACE, etc. At times, users' taps landed on the bezel of the device instead of on its keys. The signal processing filtered out the vibrations caused by tapping of the screen while walking. If vibrations were separated from walking and tapping, then there is potential to leverage the tapping vibrations to detect taps on the bezel and change the system's behavior accordingly, e.g., by entering the most likely intended letter.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a device with a touch screen for classifying a user keypress at a keypress location as an intended key, the user keypress being input by a user, the method comprising:

for each of plurality of hand postures, providing a touch pattern model for the user, the touch pattern model providing an underlying keyboard layout that is different from a virtual keyboard layout of a virtual keyboard that is displayed to the user, the underlying keyboard layout being based on a probabilistic distribution for each key derived from typing data collected from one or more users wherein the underlying keyboard layout for each hand posture is based on a predicted keypress location for keys of the virtual keyboard;

displaying the virtual keyboard on the touch screen, the virtual keyboard being independent of hand posture of the user and the underlying keyboard layout;

identifying the hand posture of the user based on characteristics of touches as the user interacts with the virtual keyboard;

receiving an indication of the keypress location on the virtual keyboard; and determining the intended key based on the keypress location and a touch pattern model for the identified hand posture wherein the intended key is derived from the predicted keypress locations as represented by the underlying keyboard layout of that touch pattern model.

2. The method of claim 1 wherein a hand posture is selected from the group consisting of typing with two thumbs, typing with just the left thumb, typing with just the right thumb, and typing with a finger.

3. The method of claim 1 including providing a language model wherein the determining of the intended key is further based on the provided language model.

4. The method of claim 3 wherein the determining of the intended key is based on a product of a probability given by the touch pattern model for the identified hand posture and a probability given by the language model.

5. The method of claim 1 wherein the touch pattern models are personalized to the user.

6. The method of claim 1 wherein the identifying of the hand posture is further based on device motion data.

7. The method of claim 6 wherein the device includes a gyroscope and the device motion data is collected from the gyroscope.

8. The method of claim 6 wherein the user touch data includes swipe shape, touch size, and elapsed time between touches.

9. One or more computer systems for classifying as an intended key a user keypress at a keypress location on a touch screen of a device, the user keypress being input by a user, the one or more computer systems comprising:

one or more non-transitory computer-readable storage mediums for storing computer-executable instructions for controlling the one or more computer systems to:

access, for each of plurality of hand postures, a touch pattern model for the user, the touch pattern model providing an underlying keyboard layout that is different from a virtual keyboard layout of a virtual keyboard that is displayed to the user, the underlying keyboard layout being based on a probabilistic distribution for each key derived from typing data collected from one or more users wherein the underlying keyboard layout for each hand posture is based on a predicted keypress location for keys of the virtual keyboard; and display the virtual keyboard on the touch screen, the virtual keyboard being independent of hand posture of the user and the underlying keyboard layout;

identify the hand posture of the user based on characteristics of touches as the user interacts with the virtual keyboard;

receive an indication of the keypress location on the virtual keyboard; and determine the intended key based on the keypress location and a touch pattern model for the identified hand posture wherein the intended key is derived from the predicted keypress locations as represented by the underlying keyboard layout of that touch pattern model; and one or more processors for executing the computer-executable instructions stored in the one or more non-transitory computer-readable storage mediums.

10. The one or more computer systems of claim 9 wherein a hand posture is selected from the group consisting of typing with two thumbs, typing with just the left thumb, typing with just the right thumb, and typing with a finger.

11. The one or more computer systems of claim 9 wherein the instructions further control the one or more computer systems to provide a language model wherein the determination of the intended key is further based on the provided language model.

12. The one or more computer systems of claim 1 wherein the determination of the intended key is based on a product of a probability given by the touch pattern model for the identified hand posture and a probability given by the language model.

13. The one or more computer systems of claim 9 wherein the touch pattern models are personalized to the user.

14. The one or more computer systems of claim 9 wherein the identification of the hand posture is further based on device motion data.

15. The one or more computer systems of claim 14 wherein the device includes a gyroscope and the device motion data is collected from the gyroscope.

16. The one or more computer systems of claim 14 wherein the user touch data includes swipe shape, touch size, and elapsed time between touches.

* * * * *